US005930375A

United States Patent [19]

East et al.

[11] Patent Number: 5,930,375

[45] Date of Patent: Jul. 27, 1999

[54] AUDIO MIXING CONSOLE

[75] Inventors: John William East, Witney; Simon Irving Harrison, Stanton Harcourt; Paul Anthony Frindle, Witney; William Edmund Cranstoun Kentish, Chipping Norton, all of United Kingdom

[73] Assignees: Sony Corporation, Tokyo, Japan; Sony United Kingdom Limited, Weybridge, United Kingdom

[21] Appl. No.: 08/649,008

[22] Filed: May 16, 1996

[30] Foreign Application Priority Data

May 19, 1995 [GB] United Kingdom .................... 9510204

[51] Int. Cl.[6] ........................ H04B 1/00

[52] U.S. Cl. ........................ 381/119

[58] Field of Search ........................ 381/61, 63, 119

[56] References Cited

U.S. PATENT DOCUMENTS

| | | | |
|---|---|---|---|
| 4,991,218 | 2/1991 | Kramer | 381/61 |
| 5,050,216 | 9/1991 | Hanzawa et al. | 381/61 |
| 5,331,111 | 7/1994 | O'Connell | 84/602 |
| 5,396,618 | 3/1995 | Fukui et al. . | |
| 5,402,501 | 3/1995 | Silfvajt et al. | 381/119 |
| 5,410,603 | 4/1995 | Ishiguro et al. | 381/61 |
| 5,539,896 | 7/1996 | Lisle | 395/477 |

FOREIGN PATENT DOCUMENTS

| | | |
|---|---|---|
| 0261483-A1 | 3/1988 | European Pat. Off. . |
| 0251646-A2 | 7/1988 | European Pat. Off. . |
| 0361315-A2 | 4/1990 | European Pat. Off. . |
| 2073994 | 10/1981 | United Kingdom . |
| 2140248 | 11/1984 | United Kingdom . |
| 2265286 | 9/1993 | United Kingdom . |
| WO 93/03549-A1 | 2/1993 | WIPO . |

*Primary Examiner*—Vivian Chang
*Attorney, Agent, or Firm*—Frommer Lawrence & Haug, LLP; William S. Frommer; Dennis M. Smid

[57] ABSTRACT

An audio mixing console for processing a plurality of audio channels, in each of which a plurality of audio processing functions are to be performed, has a control panel including a plurality of input fields for selecting audio processing functions, displaying an audio processing function selected and indicating a selected order of audio processing functions for the audio processing channel stages. A stereo mode which can be selected at an input field links adjacent channels. Grouped side chain processes can be defined. A recording input matrix provides a track bounce facility for preserving a channel mix on re-recording a mix of previously recorded tracks. Values for cue faders can be loaded automatically from the main channel faders. Selectable delays can be provided at each processing stage to maintain channel alignment. Also, the chaining of analogue audio functions is provided.

4 Claims, 9 Drawing Sheets

AUDIO MIXING CONSOLE

BACKGROUND OF THE INVENTION

1. Field of the Invention

This invention relates to an audio mixing console for processing a plurality of audio channels, in each of which a plurality of audio functions are to be performed.

2. Description of the Prior Art

Traditionally, audio mixing consoles have been based on discrete technology with audio signal processing modules connected together in a desired relationship and then controlled by manually operable switches on the console. However, traditional audio mixing consoles have a number of disadvantages including their physical size, the total number of manually operable controls (fader, potentiometers, switches, etc.), and the relative inflexibility of the overall arrangement. Typically, audio mixing consoles provided of the order of 128 channels, in each of which gain, equalisation and other audio processing functions can be performed, with a dedicated channel fader provided for each channel. In addition each channel may require about 100 parameter adjustments (e.g. gain, equalisation filter frequencies, etc.,) and buttons for controlling particular operating modes such as a solo mode to enable the monitoring of a single channel. This means that a full console will include a very large number of faders, buttons, control knobs, etc.

Accordingly, it has been proposed to provide an audio mixing console comprising a front panel including a plurality of user operable controls for controlling different audio signal processing functions and a digital signal processor for processing audio signals in response to the settings of the user operable controls. It has been proposed to reduce the number of faders by providing a mixing console with a bank of faders which can be allocated to a selected group of channels. It is hoped that such technology can lead to reductions in the overall size of such consoles while at the same time increasing flexibility. However, a disadvantage of such technology is the removal of the direct physical relationship between the actual audio functions and interconnections and user controls of the mixing console and the processing of those functions. For example, a problem arises how to arrange for the interconnection of the audio processing stages in an audio processing channel, bearing in mind that there are many such processing channels to be defined and they are not physically wired together as in a conventional audio mixing console.

SUMMARY OF THE INVENTION

In accordance with a first aspect of the present invention, therefore, there is provided an audio mixing console for processing a plurality of audio channels in each of which a plurality of audio processing functions are to be performed, the audio mixing console comprising a control panel including a plurality of input fields, each for selecting an audio processing function for a respective stage in an audio processing channel, means for displaying an audio processing function selected and means for indicating a selected order of audio processing functions for the audio processing channel stages.

By defining a plurality of input fields on the control panel the user is able to identify a particular stage in the audio processing channel currently under consideration with an input field.

Preferably, the input fields are arranged in a block on the control panel such that relative positions of the input field within the block define the order of the audio processing functions. This facilitates the interaction between the user and the console. In the preferred embodiment of the invention two rows of input fields are provided with the order of processing being from top left, along the top row, then along the bottom row to the bottom right. Another possible disposition would be a single horizontal or vertical row.

The input fields preferably comprise at least one direction control, more preferably two direction controls, (e.g., buttons) for scanning a menu of selectable audio processing functions, and means responsive to operation of the direction control to scan through the menu of selectable processing selections and to cause a display of a current menu item on the display means. In this manner the operator is able to scan through the menu of possible audio processing functions in order to identify a desired processing function. To facilitate user interaction each input field comprises a display for displaying a menu item currently accessed for the input field. Preferably also, each input field comprises a selection control for selecting an audio processing function currently displayed for the input field.

Preferably channel processing means is responsive to the input field for scanning a table of selectable audio processing functions. In the preferred embodiment of the invention, the processing channels are implemented on a highly parallel computing engine which operates at a control processing level and a signal processing level. It is the control processing level which is responsive for scanning the menu table to identify the audio processing functions selected.

The control processing means is also responsive to selection of respective audio processing functions in respective input fields to define signal processing paths whereby audio processing functions are interconnected in an order defined by the selections in the input fields.

The selectable audio processing functions for an input field include:

an equalisation function;

a fader function;

an insert function;

an audio recording function; and a dynamic range control function.

There may be, for example, eight audio processing functions selectable for a single audio processing channel. In addition, an initial input source stage and a final channel fader stage can be provided. The channel fader need not be the final stage and can be implemented at an intermediate stage.

Although reference has been made in the introduction to the description to the provision of a console with assignable controls/allocatable channels, it should be noted that the invention is not limited to consoles with controls which can be assigned to allocatable channels. However, in an embodiment of the invention in which channel control function controllers can be assigned to a selected channel, the console can comprise means for allocating an audio processing channel from a plurality of audio channels to the input field for selecting the audio processing functions for the allocated audio processing channel. This can be used to limit the number of input fields required.

In accordance with another aspect of the invention, there is provided an audio mixing console with stereo mode means which is selectable for a given channel and is responsive to selection of a left channel stereo mode function to activate a right channel stereo mode function in the next channel to the right on the panel of the given channel, and is responsive to selection of a right channel stereo mode function to activate a left channel stereo mode function in the next channel to the left on the panel of the given channel.

In accordance with a further aspect of the invention, there is provided an audio mixing console for processing a plurality of audio channels in each of which a plurality of audio processing functions are to be performed, the audio processing console comprising bus means connecting multiple side chains for respective audio processing channels and logical function means effecting matching of side chain processing of groups of audio processing channels.

In a further aspect of the invention, the audio mixing console comprises a recording channel input matrix arrangement for allocating signal processing channels to recording tracks on a multichannel recording device, channel faders for adjusting output signal levels from respective tracks before being passed via a mixer to form an output signal and switch means for selecting either input signals from signal processing channels or signals fed back from the main channel faders to be input to the routing matrix arrangement to form a mixed signal to be recorded on a recording track. This mechanism allows a balance set up on the channel faders to be preserved when recording multiple source tracks on a single recording track, for example where there is a shortage of recording tracks available.

In yet a further aspect of the invention there is provided an audio mixing console comprising channel fader means for adjusting a mix of audio processing channels, a main mix function connecting an output of the channel faders to a main audio output, the main audio output being connectable to studio monitors, the console additionally comprising cue faders for the audio processing channels, a cue output mix connecting an output of the cue faders to a cue audio output, the cue audio output being connectable a musician's headphones, and means for selectively passing channel fader values to the cue faders.

A further aspect of the invention provides an audio mixing console for processing a plurality of audio channels in each of which a plurality of audio processing functions are to be performed at respective audio processing stages, the audio mixing console comprising a selectable delay function insertable at each stage in each audio processing channel for delay equalisation and means for selecting a particular delay dependent on the delay requirements. The selectable delay function provides a flexible method for taking account of the differing delays in different digital audio processing functions and when converting between analogue and digital data for external analogue effects processing, for example. A plurality of selectable delays, including a straight through path can be provided.

In accordance with another aspect of the invention, there is provided an audio mixing console for processing a plurality of audio channels in each of which a plurality of audio processing functions are to be performed at respective audio processing stages in digital audio processing channels and means for inserting analogue audio processing functions in the digital audio processing channels, the means comprising a digital to analogue converter for signals from the digital audio processing channel to the inserted analogue audio processing function and an analogue to digital converter for signals from the inserted analogue audio processing function to the digital audio processing channel.

Preferably, to avoid excessive D to A and A to D conversion delays, the means for inserting analogue audio processing functions comprises means for chaining a plurality of analogue audio processing functions having analogue interconnections, and a digital to analogue converter for signals from the digital audio processing channel to a first analogue audio processing function in the chain of analogue audio processing functions and an analogue to digital converter for signals from a last analogue audio processing function in the chain of analogue audio processing functions to the digital audio processing channel.

BRIEF DESCRIPTION OF THE DRAWINGS

An embodiment of the invention will be described by way of example only with reference to the accompanying drawings in which.

DESCRIPTION OF THE PREFERRED EMBODIMENTS

Figure 1:
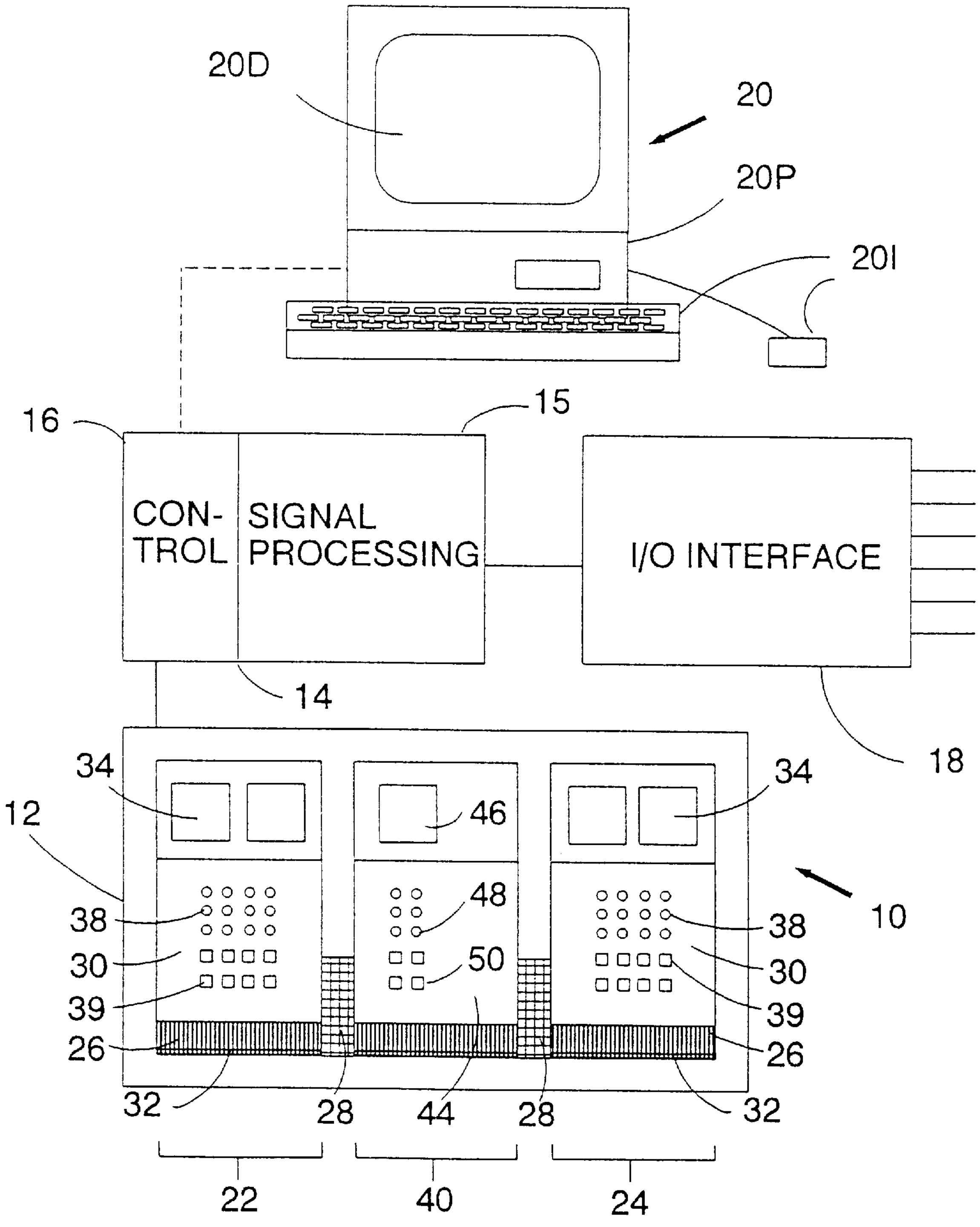
FIG. 1 is a schematic block diagram of a mixing console for audio signal processing.

FIG. 1 represents a simplified schematic block diagram of a mixing console 10 for use in an audio recording studio. The console 10 comprises a front panel 12, a processor network 14 comprising an array of signal processors 15 and a plurality of control processors and buffer circuitry 16, and one or more input/output interface processors and interfaces 18. Also shown in FIG. 1 is a host unit 20, which could be permanently connected to the remainder of the system, or could be connected only during initialisation and debugging stages of operation.

The panel 12 comprises an array of operator controls including faders, switches, rotary controllers, video display units, lights and other indicators, as represented in a schematic manner in FIG. 1. Optionally the panel 12 can also be provided with a keyboard, tracking device(s), etc. and general purpose processor (not shown) for the input of and control of aspects of the operation of the console. One or more of the video display units on the panel can then be used as the display for the general purpose computer.

In one embodiment, the host unit 20 is implemented as a general purpose workstation incorporating a computer aided design (CAD) package and other software packages for interfacing with the other features of the mixing console. The host unit could alternatively be implemented as a purpose built workstation including special purpose processing circuitry in order to provide the desired functionality, or as a mainframe computer, or part of a computer network. As shown in FIG. 1, the control unit 20 includes a display 20D, user interface devices 20I such as a keyboard, mouse, etc., and a processing and communication unit 20P.

In normal operation, control of the mixing console is performed at the front panel, or mixing desk 12. The mixing console 10 is connected to other devices for the communication of audio and control data between the processor network 14 and various input/output devices (not shown) such as, for example, speakers, microphones, recording devices, musical instruments, etc. Operation of the studio network can be controlled at the front panel or mixing desk 12 whereby communication of data between the devices in the studio network and the implementation of the necessary processing functions is performed by the processor network 14 in response to operation of the panel controls.

The processor network 14 can be considered to be divided into a control side 16, which is responsive to the status of the various controls on the front panel 12, and an audio signal processing side 15 which implements the required audio processing functions in dependence upon the control settings and communicates audio data with the studio network via the I/O interface 18.

The processing of digital audio data is performed by a parallel signal processing array 15 comprising a large number of signal processing integrated circuits (SPICs). The SPICs operate under microprogram control, microcode being loaded by the host unit 20 in an initialisation phase of operation. In the preferred embodiment the processor network 14 is arranged on a rack to which is attached a plurality of cards. Each card carries an array of, for example, 25 SPICs, the horizontal and vertical buses being connected between the cards so that from a logical and electrical point of view the SPICs form one large array. The buses may be connected in a loop with periodic pipeline registers to allow by-directional communication around the loop and to extend the connectivity of the array. The signal processors are also connected to the I/O interface 18.

The parallel processing array as a whole provides for the implementation of all the audio processing functions that are required depending on the configuration of the studio network and the control settings at the front panel 12 by defining digital audio processing channels on the signal processing network. The microcode loaded during the initialisation phase provides for individual audio signal processing functions, although the routing of data and the supply of coefficient data is under the control of the control processor(s) 16 at run time. To switch in or out a particular function, or to alter the routing of data, the control processor (s) 16 interface with the array of SPICs 15 to write signal data, coefficients and addresses to the SPICS and to read signal data, coefficients and addresses from the SPICS.

The control processor(s) 16 are responsive to operation of the user operable panel controls such as channel faders 26, switches 39 and control knobs 38, etc., by an operator to vary the characteristics such as signal levels, etc., of audio signals.

As can be seen in FIG. 1, the control panel of the mixing console is divided into two main sub-panels 22 and 24 with a central control panel 40. The sub-panels 22 and 24 are preferably configured in the same manner so that the user may use either the left hand or right hand sub-panel without having to adapt his or her mode of operation. The central control panel 40 contains centralised functions which are applicable to the overall operation of the control panel and to the operation of the individual sub-panels 22 and 24.

Each sub-panel 22 and 24 is arranged with a bank of channel faders 26 adjacent to the user. These channel faders 26 provide the main channel faders for adjusting the gain of selected channels. Above each bank of faders 26 is a control area 30 containing a plurality of user input devices such as rotary control knobs 38 and control buttons 39. The control knobs 38 are used for adjusting control parameters and the control buttons 39 are typically used for switching in and out control functions. The various user operable controls can be arranged on the control area 30 in a manner appropriate for the typical audio signal processing functions to be performed. By arranging the controls on the control area in a logical manner user operation of those controls is facilitated.

The central control area 40 also includes a set of faders for controlling main console operations including a master fader for controlling the overall gain of the audio console. It also includes a control field 44 including control knobs 48 and control buttons 50 for adjusting overall control functions and for assigning and switching in and out selected functions.

Between each of the sub-panels 22 and 24 and the central control area 40, a block of push-buttons 28 is provided for selecting a group of available channels (e.g. 256 channels in the preferred embodiment) to be assigned to the channel faders 26 (e.g., the 16, 24 or 32 channel faders) of the adjoining sub-panel 22 or 24.

Directly below each fader of the bank of channel faders 26 is an access control button of a bank of access control buttons 32 for assigning the associated control area 30 to a particular channel to which the particular control button 32 in the button bank and the corresponding fader 26 in the fader bank is assigned. The access control buttons 32 are provided with illumination to indicate that a particular access control button 32 has been activated and the channel been accessed.

Each of the sub-panels 22 and 24 and the control panel 40 includes visual displays 34, 46 for representing desired information. Also, visual indicators are associated with the buttons 32 and 39 (e.g., lights in the buttons) to indicate when they are activated and visual displays are associated with the control knobs 36 to indicate the current "position" of those control knobs.

Figure 2:
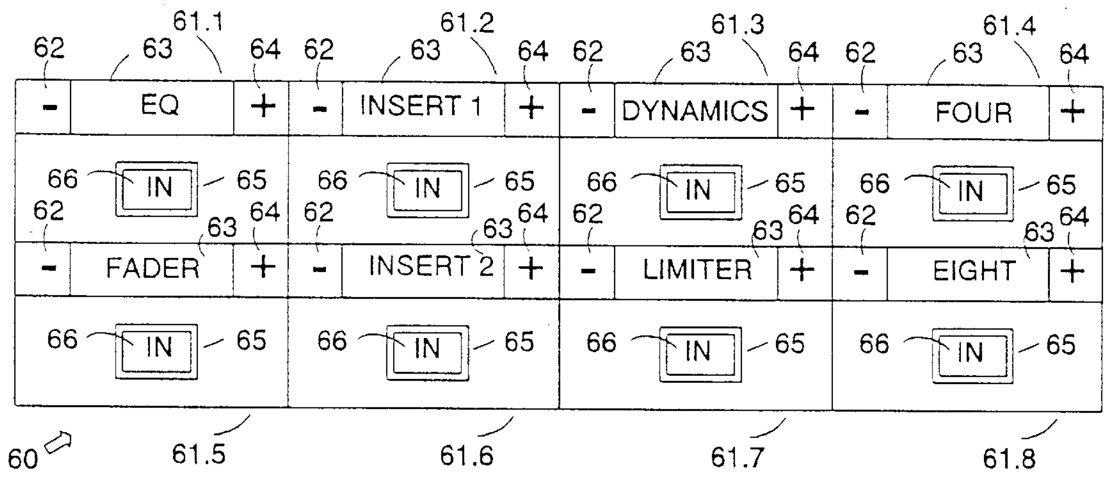
FIG. 2 is a schematic representation in more detail of a part of a control panel of the mixing console of FIG. 1.

FIG. 2 is a schematic representation of part of the control area 30 for one bank of faders 26. The portion of the control area 30 represented in FIG. 2 relates to user input fields 61 for selecting audio processing components to be inserted in series in an audio processing channel in the audio mixing console of FIG. 1. A similar block 60 of input fields 61 is provided in the other control area 30 for the other sub-panel. Specifically, the sequencing block 60 comprises an array of boxes or input fields 61 for defining individual elements in the audio processing channel. Each input field comprises a header area having a minus button 62, a display 63 for indicating menu item (audio processing functions) and a plus button 64. The plus and minus buttons 64 and 62 are used for sequencing through a menu of possible audio processing functions. A name for the functions appears within the display 63. When the correct function has been identified, a "IN" button 65 in the main area of the box can be pressed whereby the audio processing element identified at 63 is then inserted at the position in the audio processing channel represented by the position of the input field 61 in the sequence of input fields within the block 60. The sequence is defined from top left along the top row and then along the bottom row to the bottom right. When the button 65 has been activated, it illuminates as indicated at 66. When no function has been entered for an input field, the display 63 for that position indicates the field position (e.g, Four for field 61.4 and Eight for field 61.8). In FIG. 2, an audio processing chain is represented which comprises an equaliser at input field 61.1, a first insert at input field 61.2, dynamics processing at input field 61.3, no function at input field 61.4, a fader control at input field 61.5, a second insert at input field 61.6, a limiter at input field 61.7 and no function at input field 61.8.

In a preferred embodiment of the invention up to eight processing stages can be specifically identified in the eight input fields. The main channel fader is by default after the last input field 61.8, unless, as illustrated in FIG. 2, the main channel fader has been specified at one of the input fields 61 (in FIG. 2 at input field 61.5).

Figure 3:
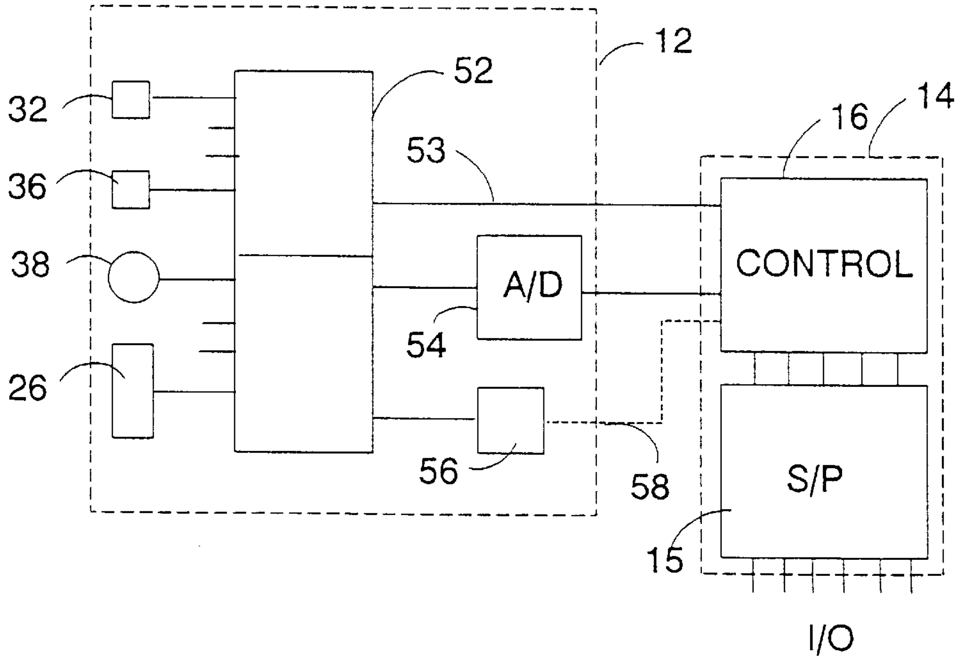
FIG. 3 is a schematic representation of the interconnection of user operable controls on the control panel 12 and the signal processing network of the mixing console of FIG. 1.

FIG. 3 is a schematic representation of the relationship between the user input devices (including the switches 32 and 36—also the plus and minus buttons 64 and 62 and the IN buttons 65 of FIG. 2 —and the analogue user devices 26 and 38) on the control panel and the signal processing network 15. Specifically, the control panel 12 comprises a multiplexing arrangement 52 which is responsive to a scan controller 56 to individually sample all of the user operable controls on the control panel in sequence. The values samples from the user input devices providing binary output signals such as the switches 32, 36, 62, 64 and 65 are passed directly via a line 53 to the processor network 14 as time multiplexed signals. Analogue values sampled from analogue input devices such as control knobs 38 and fader 26 are supplied in a time multiplexed manner via an A/D converter 54 to the processor network 14. Thus, the user operable controls on the control panel 12 are sampled in a manner which will be familiar to one skilled in the art of user input devices such as keyboards, etc. The scanning controller 56 can be included within the control panel 12 as illustrated in FIG. 2, or, alternatively, the scan control can be provided directly from the signal processing network 14 as represented by the dashed line 58.

The time multiplexed signals from the A/D converter 54 are processed in the control processor(s) 16 where the input signals are allocated to separate control and signal processing channels with the necessary signal processing functions being performed on the network 15 of signal processors SP in signal processing channels and with the input and output audio signals being supplied via input and output lines I/O.

In operation, in the present embodiment of the invention, the user selects a particular group of the available channels (e.g, one of 32 groups of sixteen channels from 256 channels in this embodiment), by operation of an appropriate one of the block of keys 28 for a particular sub-panel (e.g. sub-panel 22). Then, by operation of the access control key for a particular channel fader in the bank of faders 26, the user assigns the control knobs and buttons 38 and 39 and the block 60 of the control area 30 to the selected channel. The audio processing stages for the selected channel can then be defined using the input field 61 of the block 60. Subsequently, the control parameters for that audio processing channel can be adjusted and controlled by operation of the user operable control knobs 38, buttons 39, and the channel fader for that channel. At that time, the gain for the other channels in the selected group of channels can be adjusted by the other faders within the bank of faders 26. The group of channels selected can be changed at any time by operation of an appropriate key in the block of keys 28 and the assignment of the control knobs 38 and buttons 39 in the control area 30 can be changed to any one of channels of the selected group of channels by operation of the appropriate control button in the bank of control buttons 32.

Figure 4:
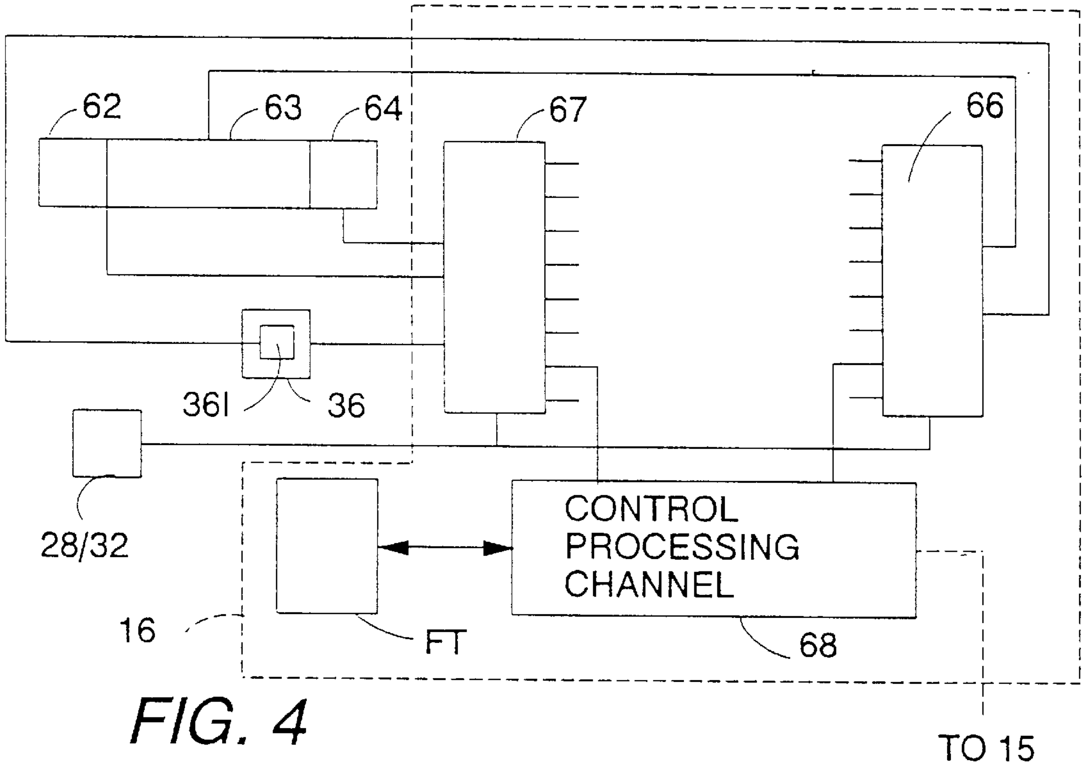
FIG. 4 is a schematic representation of aspects of a processing channel of the mixing console of FIG. 1.

FIG. 4 is a schematic representation of aspects of a control structure for assignable control processing channels implemented in the control processors. In FIG. 4 it will be appreciated that the direct line connections between the control buttons 62, 64, 65 and 28/32 and the control processing structure 67 represent, in the present example, connections via a control structure such as illustrated in FIG. 3 with the control processing structure 67 of FIG. 4 being implemented on the control processor(s) 16 of FIG. 3. In the control processor(s) 16, the signals for the control button 62, 64, 65 and 28/32 are identified from the appropriate time slots in the scanning sequence described with reference to FIG. 3.

FIG. 4 is intended to illustrate the operations involved in the selection of an audio processing function to be inserted at a particular position corresponding to one of the input fields 61 in the block 60 of FIG. 2 in the context of the present embodiment having assignable channels. For reasons of ease of explanation, the corresponding buttons and indicators 62–65 for the other input fields 61 are not shown in FIG. 4. Block 67 is an assignment function controlled by the operation of one of the block of control buttons 28 to select a group of control channels and the operation of an individual access control button 32 in the bank of access control buttons 32 to select an individual channel. Accordingly, inputs from the buttons 62, 64 and 65 are passed to a channel 68 for processing. In accordance with the pressing of the plus 62 and minus 64 buttons, the control processor 68 sequences through a function table FT for selecting a particular function to be inserted at the appropriate point in the audio processing channel. The processing channel 68 outputs a signal via the routing controller 69, which is also responsive to the operation of the control buttons 26 and 32, to cause the display on the display 63 of name of the appropriate function extracted from the table FT. When the user has identified the correct function to be identified at the appropriate position in the audio processing chain, he or she operates the "IN" button 65 to insert that function. The control processing channel 68 is responsive to operation of the button 65 to actually insert the selected functioning addresses for software objects and/or hardware processing units for the functions concerned (the addresses being stored in or associated with the function table FT) in an appropriate position in the audio processing channel and returns a signal via the routing controller 69 to cause the illumination of the lamp 66 associated with the button 65.

Figure 5:
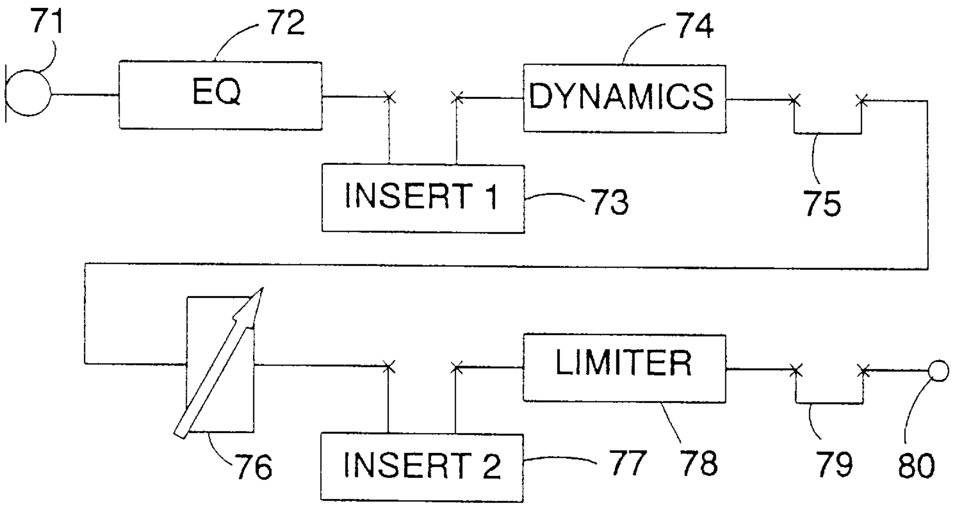
FIG. 5 is a schematic representation of a possible audio processing channel to be implemented on the console of FIG. 1.

FIG. 5 is a schematic representation of the audio processing channel represented in the sequence of input fields shown in FIG. 3. Specifically, it is assumed that the initial input is from a microphone 71, this being passed by an equalisation filter 72, a first insertion being made at 73, dynamics processing being performed at 74, no function at 75, level control being exercised at 76, a second insertion being made at 77, a limiter function being performed at 78 and no function at 79 with the resulting audio signal is output at 80.

Figure 6:
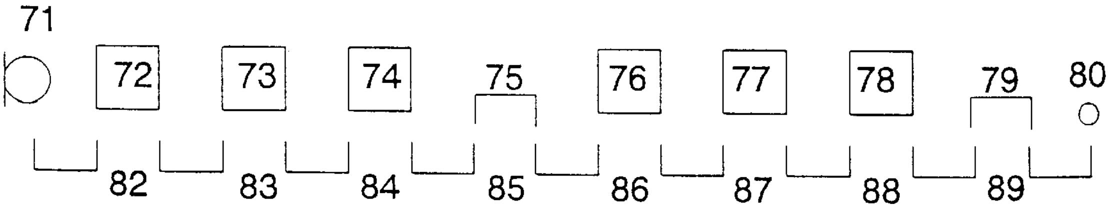
FIG. 6 is a schematic representation of an implementation of the audio processing channel of FIG. 5 on the console of FIG. 1.

FIG. 6 is a schematic representation of the manner in which the present invention implements an audio processing chain as shown in FIG. 5. Specifically, the references 82–89 correspond to the references 72–79 of FIG. 5, respectively. As an audio mixing console in accordance with the present invention is a digital processing device, digital audio processing is performed in a digital sequence represented by the horizontal lines joining the various connection stages represented by upstanding lines in FIG. 6. Between pairs of upstanding lines (at possible insertion points), digital signals are output and returned from functional units which are effectively "plugged in" to the digital audio processing chain, for example by calling appropriate software objects or hardware elements using the addresses from the function table FT.

Figure 7:
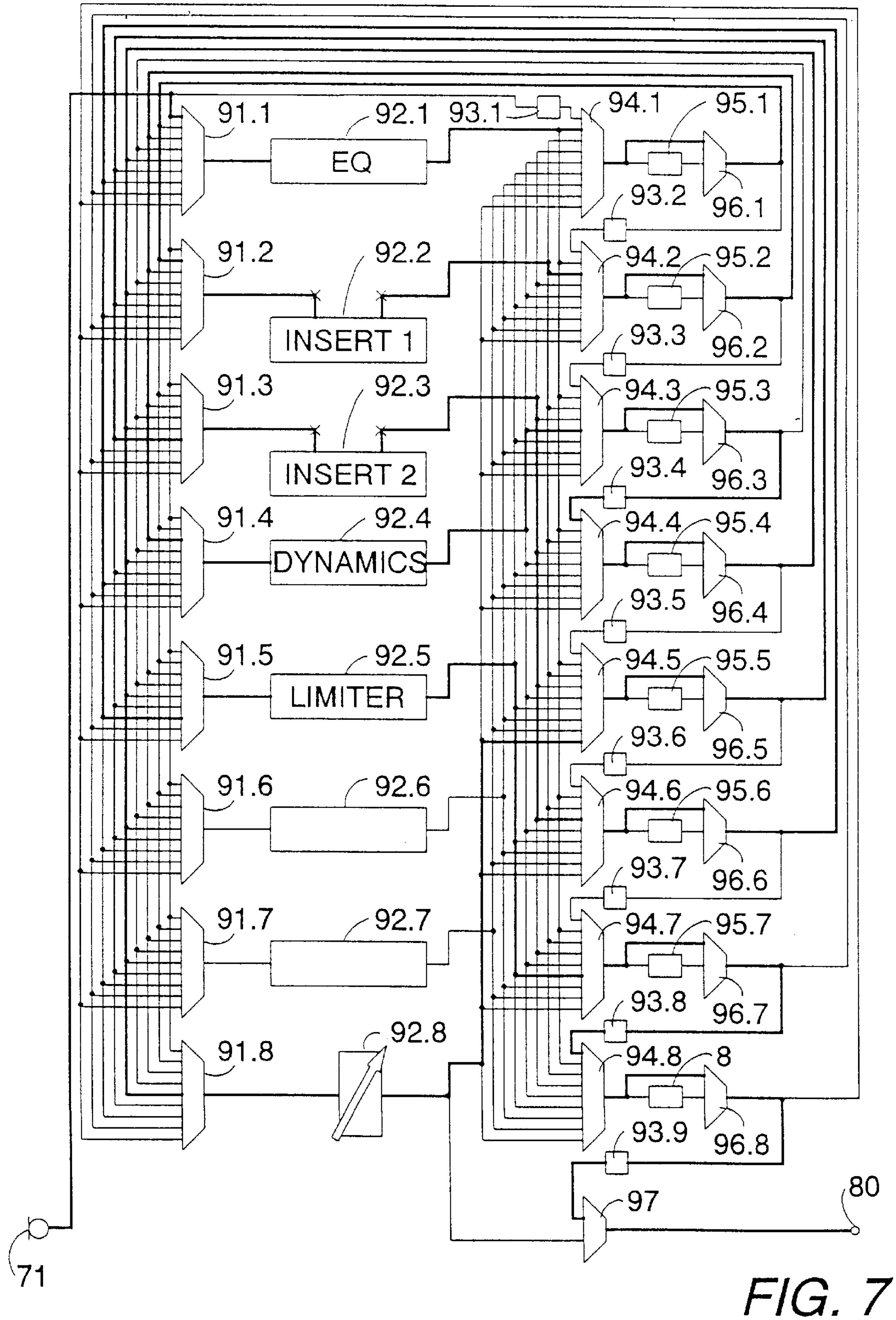
FIG. 7 is an alternative representation of the implementation of the audio processing channel of FIG. 5 on the console of FIG. 1.

FIG. 7 is a schematic representation of the logical connection of the individual audio processing functional units, which can be connected into the audio processing chain represented in FIG. 6. A set of audio processing functions are defined at 92.1, 92.2, 92.3, 92.4, 92.5, 92.6, 92.7, 92.8, etc. representing functions or objects such as those illustrated in FIGS. 5 and 6, but also including other processing functions not specifically represented therein. For example, it is possible that an audio processing function (e.g. 92.6) might be the storage of audio signals on a tape recorder channel, a filter function, etc. It will be appreciated that the number of available audio processing functions can be selected for a particular embodiment and/or application of the invention.

Delay elements 93 provide a short delay for compensating for internal delays when no audio processing function is selected. Delay elements 95 provide for switchable delays (by selective operation of the multiplexer functions 96) for the audio signal path, for equalising, for example, delays between signals from separate channels to be mixed or synchronised when an outboard analogue function is inserted in another channel as will be explained later.

Multiplexer functions 91, 94, 96 and 97 are used for routing the audio signals being processed. Multiplexer functions 91 are used to select the inputs to the audio processing functions 92. Multiplexer functions 94 are used to select the routing of the signals between processing stages. Multiplexer functions 96 are used to select the long delay for compensating for an analogue insert function in a corresponding stage of another channel (in the example shown in FIGS. 5 and 7, it is assumed that no compensation of this type is required). Multiplexer function 97 automatically selects the channel fader 92.8 after the eighth stage if it is not selected in one of the eight stages, otherwise it passes the output of the eighth stage to the output 80.

An example of the connection of a signal path for implementing the audio processing channel of FIG. 5 is represented by the bold lines in FIG. 7. Specifically, an input signal from the microphone 71 follows a path to the output 80 via:

mux 91.1, equaliser 92.1, mux 94.1, mux 96.1;
mux 91.2, insert 1 92.2, mux 94.2, mux 96.2;
mux 91.4, dynamics 92.4, mux 94.3, mux 96.3;
delay 93.4, mux 94.4, mux 96.4;
mux 91.8, fader 92.8, mux 94.5, mux 96.5;
mux 91.3, insert 2 92.3, mux 94.6, mux 96.6;
mux 91.5, limiter 92.5, mux 94.7, mux 96.7;
delay 93.8, mux 94.8, mux 96.8;
delay 93.9, mux 97.

The control of the multiplexer functions 91, 94, 96 and 97 is performed by the control processing channel in order to provide the correct routing of audio signals through the various audio processing functions to implement the audio processing sequence represented in FIG. 5. It will be appreciated that the use of the multiplexers for sequentially passing signals as shown in FIG. 7 provides the logical equivalent to the audio processing chain represented in FIG. 6.

The structure represented in FIG. 7 is, in the preferred embodiment of the invention, including the audio processing functions and the routing of information between them, performed in software on the signal processing units of the signal processing array 15 of FIG. 3. In the preferred embodiment of the invention the control processor(s) 16 write appropriate routing addresses from the function table FT into the microcode of the SPICs for accessing appropriate software or hardware objects. The output 80 forms the output of a channel which can be mixed with the output from other channels to be connected to a main audio output. Software contention control is used to avoid the incorrect routing of the digital audio data between the various audio processing functions in a manner which will be apparent to one skilled in the art.

As mentioned above, up to eight digital signal processing effects may be applied to each channel, and these may be inserted in the signal path in any configuration. Thus, as a result of the operation of the eight input fields having the dot matrix alpha numeric display, plus minus buttons and an IN button, the correct positions in a signal path can be determined in sequence from top left to bottom right.

As mentioned above, the main channel fader can also be positioned after the last item in the eight input fields if it has not already been specified in one of those fields. If it is desired to include processing after the fader (as in the example described with reference to FIGS. 3, 5, 6 and 7), then "fader" may be selected in one of the input fields and the required processing selected in a later input field.

Tape send and return functions may also be selected at any of the eight input fields. By selecting "multi" (multi-track recorder) in the chain of input fields, the multi-track tape recorder is positioned at any point in the channel. For example, if "EQ" is selected in the first input field followed by "multi" in the second, an equalised recording will be made with a direct (non-equalised) monitor return. Alternatively, "multi" in the first input field and "EQ" in the second would result in a non-equalised recording, but an equalised monitor return. This arrangement provides a simple and convenient way of selecting an order for the signal processing elements in the audio processing channel from the control panel.

Another function which can be selected in the "input fields" 61 represented in FIG. 3 is a "stereo" function. Specifically, this represents a way of linking two channels together in the mixing console without the need to provide a fixed mechanical link between the channel faders for those channels. The conventional mechanical link is a rather crude and inflexible method. By use of the stereo function in accordance with a preferred embodiment of the invention, greater flexibility is achieved.

Specifically, when selecting audio processing functions using the plus and minus buttons 62 and 64 in the input fields 61, it is possible to select either a "stereo L" or a "stereo R" functions. If "stereo L" is selected, the channel currently being processed is automatically linked to the channel on its right on the control panel. In other words, the channel assigned to the currently selected channel fader is linked to the channel currently assigned to the channel fader to its right. Thus, the presently selected channel becomes the left channel of a stereo pair. Similarly, if "stereo R" is selected, the channel assigned to the currently selected channel fader becomes the right channel of a stereo pair where the left channel of the stereo pair is the channel currently assigned to the immediately adjacent channel fader to the left. The selection of "stereo L" and "stereo R" automatically leads to the insertion of the appropriate entry (either "stereo R" or "stereo L") in the other channel's signal path. Although this will not immediately be visible in the context of the present embodiment as the content of the input fields 61 only relates to the currently selected channel, switching the currently selected channel by means of the access button 32 for the immediately adjacent channel will cause the display of the content of the input fields 61 relating to that channel. It can then be verified that the appropriate information has been inserted in that channel.

Figure 8:
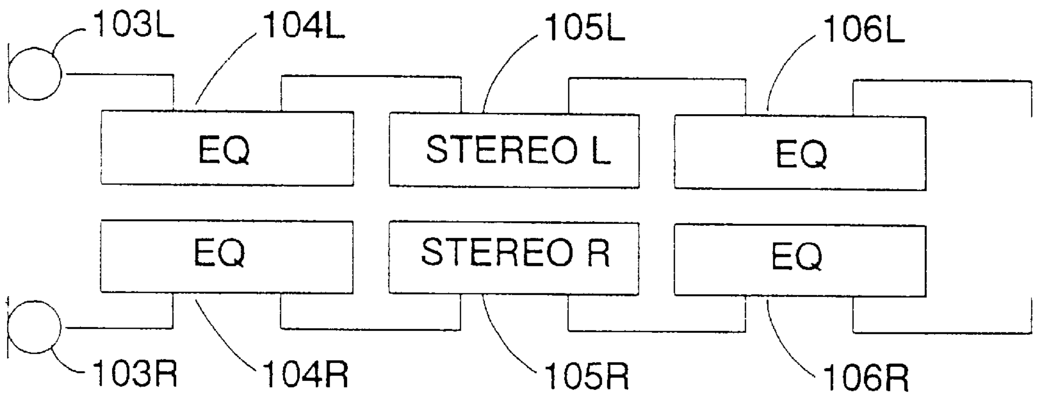
FIG. 8 is a schematic representation of a stereo function.

FIG. 8 represents the linking of two channels where the left and right channels have microphone input 103L and 103R, equalisation stages 104L and 104R, the inserted stereo left function 105L and the automatically generated stereo right function 105R and various further stages not represented in FIG. 8.

The result of the association of channels is that some or all of the settings from the channel used to select stereo are copied to the associated channel. The settings to be copied could be selected by means of a selection menu. In a preferred embodiment of the invention, the main channel faders are motorised so that any movement on a left hand channel fader will cause a corresponding movement on the right hand channel fader controlled vis the link between the stereo left and stereo right functions. Additional controls including, for example, a balance control and a width control can be provided and arranged to become active on selecting a stereo function. Also, the linking of side chains can be activated on selection of a stereo function. Thus, the stereo function provides a flexible method for automatically linking any two numerically adjacent channels and enables control of any desired function.

Figure 9:
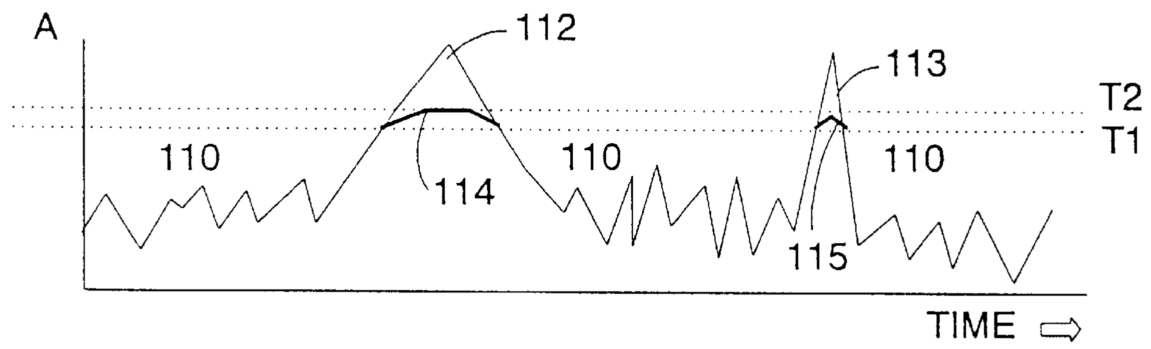
FIG. 9 is a diagram illustrating a possible application for a side chain processing channel.

During dynamic audio processing to modify dynamic range, various processing effects can be generated. This is achieved by the production of a side chain signal which is then used to control the gain of the original audio signal. The side chain signal is produced in a side chain, that is not within the main processing chain represented in FIG. 6. An example of the use of side chains is where it may be desirable to change gain with a particular profile to avoid extreme effects. FIG. 9 represents a signal which, for the most part, is well below a threshold T1 as represented at 110. However, at certain times, represented at 112 and 113, the signal exceeds the threshold T1.

Figure 10:
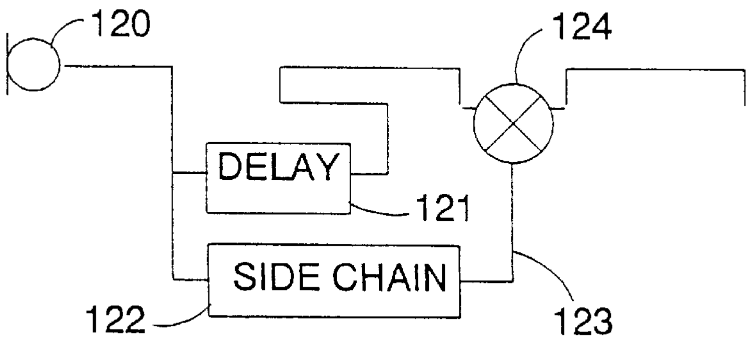
FIG. 10 is schematic representation of a side chain processing channel.

FIG. 10 represents the use of a side chain to apply a variable gain function in order to avoid the extreme effects of FIG. 9. Specifically, the input from a microphone 120 is passed via a delay stage 121 to a multiplier 124 at successive insert positions. The signal input to the delay 121 is also input to a side chain processor 122 to perform desired processing based on the input signals (for example, by applying limiting with desired attack and release characteristics) to produce an output signal on line 123 which is used for controlling the multiplier gain 124.

In this way, the signals at 112 and 113 can be modified as desired to produce signals which do not exceed a second threshold T2, for example at 114 and 115, respectively, by reducing the gain of signals exceeding T1.

Figure 11:
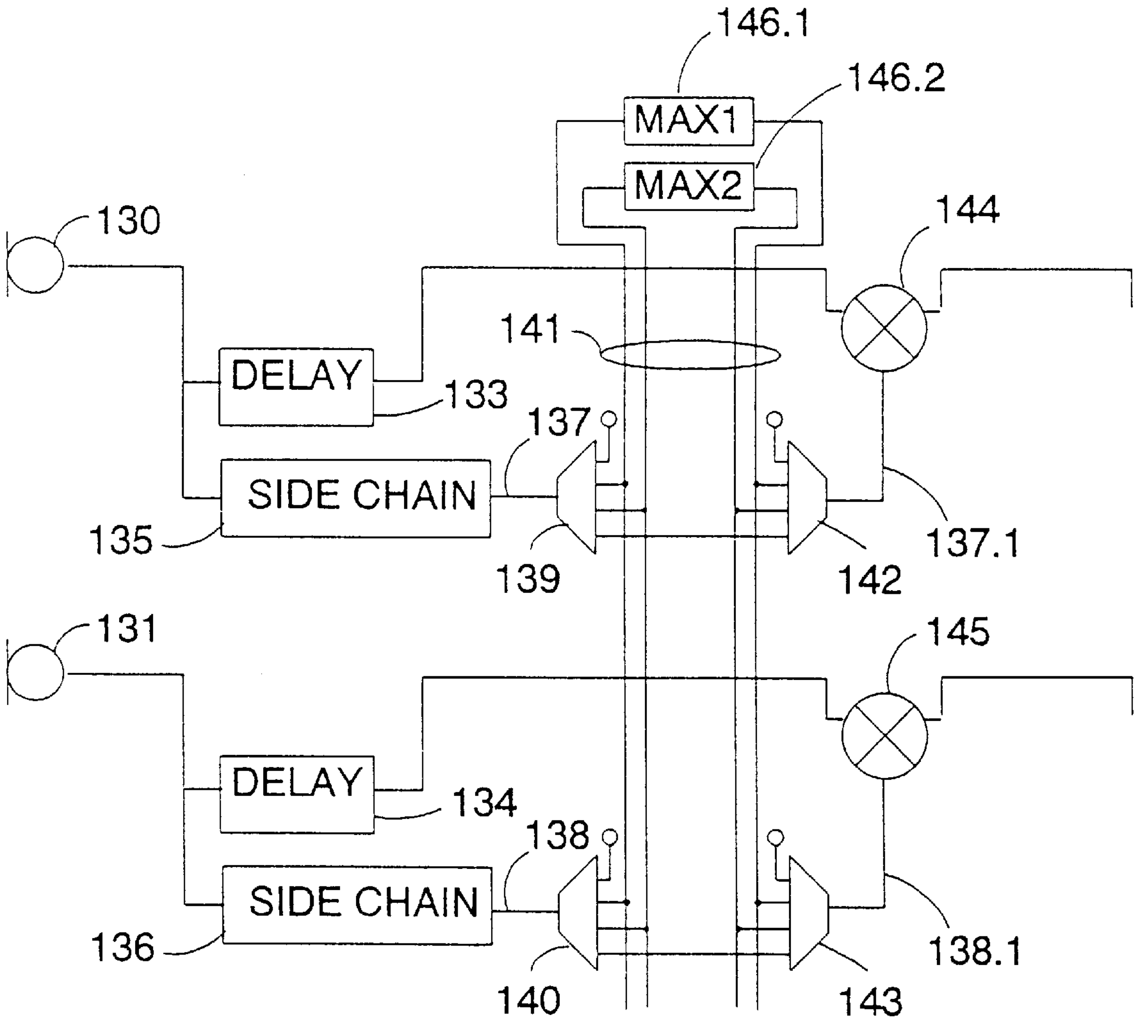
FIG. 11 is a schematic representation of the connection of two side chains by a side chain bus.

FIG. 11 represents the grouping of related side chains, for example where two stereo channels are provided in order that each of the channels can be provided with the same side chain processing and the same resulting gain control. As represented in FIG. 11, a first dynamics processor receives an input from a signal 130, passes that signal through the delay 133, and also passes that signal through the side chain 135 to produce an output at 137 which, in principle, is to be supplied to the gain control 144. Likewise, in the second channel, the output from a microphone 133 is passed via a delay 134 is and also passed through the side chain 136 producing an output at 138 which, in principle, is to be supplied to a gain control 145. Indeed, through an appropriate connection of the demultiplexer 139 and the multiplexer 142, the signal at 137 can be passed via line 137.1 to the gain control 144. Likewise, by an appropriate connection of the demultiplexer 140 and the multiplexer 143, the signal at 138 can be passed via line 138.1 to the gain control 145.

However, to correlate the gain control in separate channels, a side chain bus 141 is provided with one or more functions (e.g., a first maximum function 146.1 and a second maximum function 146.2). By appropriate switching of the demultiplexers 139 and 140 and the multiplexers 142 and 143, the side chain signals 137 and 138 can be passed via the functions 146.1 or 146.2 before being passed via the lines 137.1 and 138.1 to the gain controls 144 and 145. The side chain signals from any channel can be assigned to any channel, including its own channel, by appropriate switching of the demultiplexers 139 and 140 and multiplexers 142 and 143.

Figure 12A:
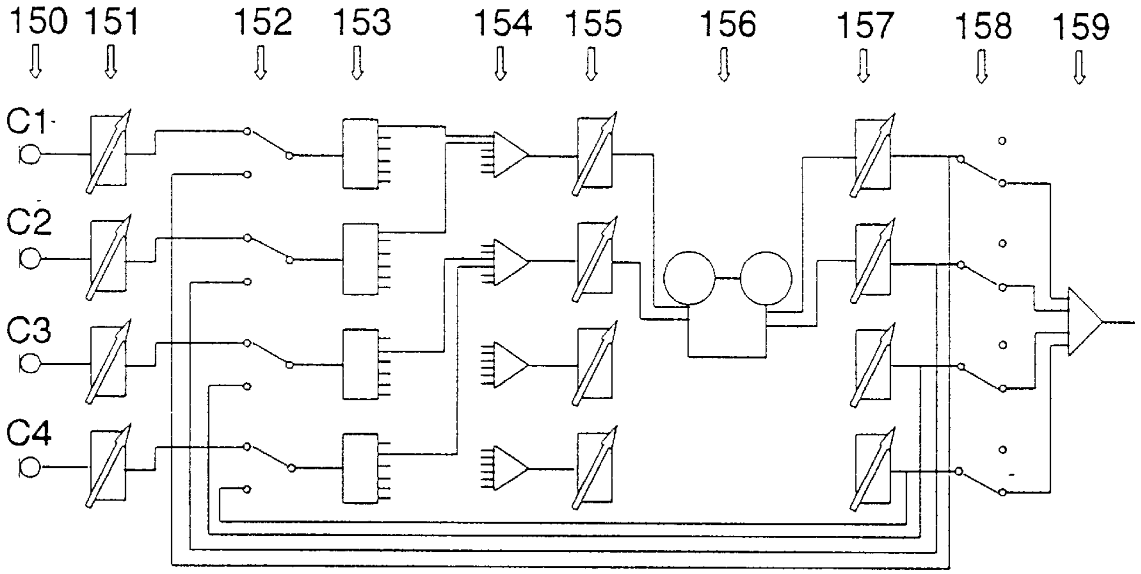
FIGS. 12A and 12B form a schematic representation of a "track bounce" feature.
Figure 12B:
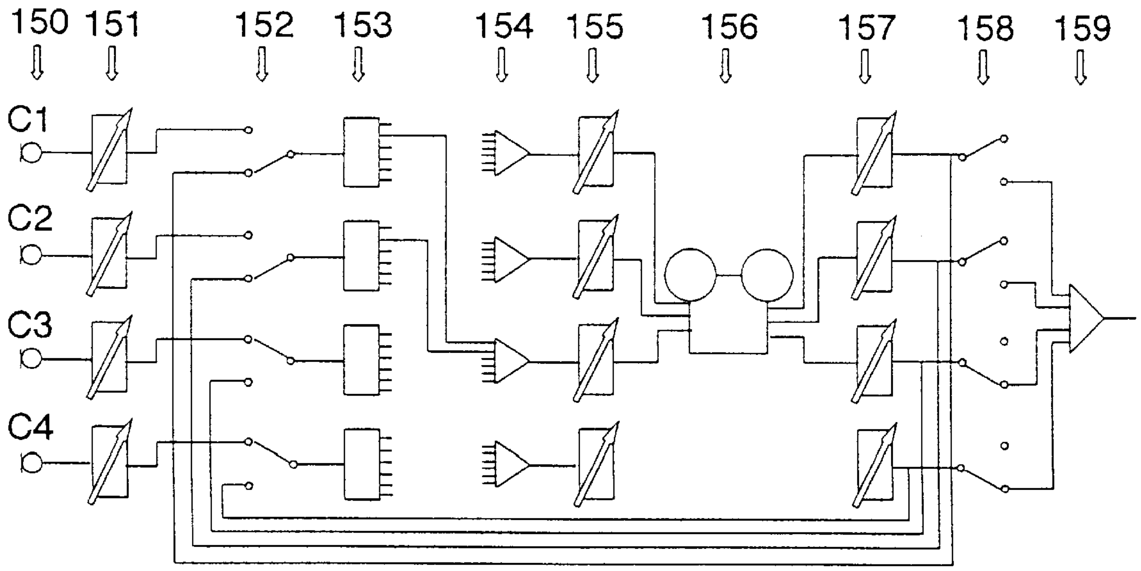

FIGS. 12A and 12B represents the provision of a facility known as "track bounce". Most recording sessions are rather unpredictable events. As a piece of music is being recorded, artistic decisions are constantly being made and re-made. This often results in experimentation or changes of course in mid-session, which can cause difficulties for the recording engineer. To keep creative options open until the final mix, it is preferable to record every microphone on a separate track. However, the number of recording tracks on a recording device is limited (typically 24 or 48). Thus the engineer must made decisions about the best way to group instruments onto the tracks to make best use of them. To some extent this can be planned in advance, but if circumstances change, difficulties may arise. For example, if one musician is making a lot of mistakes, it may be desirable to record several versions of his part, which can subsequently be edited together. Alternatively, it may be desired to add a string sections or additional vocal lines which had not originally been expected at the start of the session. This can result in a shortage of tracks occurring. At this point the engineer has to find more tracks, traditionally by either adding a second, synchronised recorder, or by making more use of the tracks he has by means of a technique which can be termed "bounding down".

When "bouncing down", a group of tracks, normally related in some way, are mixed together and re-recorded on fewer tracks. For example, three backing vocal tracks may be "bounced down" to a stereo (2-channel) vocal track, thereby releasing one spare track. Alternatively, a stereo piano and stereo synthesizer might be combined to a stereo keyboards track. Clearly, once these tracks have been combined, their relative balance is fixed as if they had been recorded on a single track initially. It is to be noted that it is only possible to "bounce down" if there are vacant tracks available, so that the decision to bounce down tracks must be made before all the tracks are used up. Prior to the decision to "bounce down" the tracks in question, they will each have their own monitor fader, which the engineer will have adjusted to the appropriate level in the mix. To perform the bounce, however, he will have to patch (typically by using a physical connector), the monitor outputs from the tape recorder to the input channels, to allow them to be recorded on the new channel in the normal way. The monitor faders are not included in this path (since their outputs drive the monitor bus, not the routing matrix for the recorder), so that the existing balance information is lost. The engineer now has manually to re-create the balance between the tracks to be bounced, and this is unlikely to be an exact process. This is a considerable disadvantage as the correct balance may have taken a long time to achieve.

An embodiment of a console in accordance with the invention is arranged in what amounts to a substantially in-line configuration in which each strip of channel functions contain both the input (channel) path to and the output (monitor) path from the recording device. The routing structure of the console does, however, permit a split console, that is a console where monitor sections are separate from the channel sections, to be mimicked.

FIGS. 12A and 12B illustrate a flexible routing structure in accordance with an aspect of the invention whereby, on deselecting the output signal from a channel fader to the main output from the console, the signal output from the channel fader can be used to feed a multitrack routing matrix replacing the signal from the input part of a channel. This allows the channel fader output signal to be routed to any of the tracks on the recorder as if it were an input signal, but with the crucial difference that it is being fed via the same fader which was controlling its balance in the monitor mix. For example, if three individual tracks are deselected from the main output and routed to the same "new" track, the balance between them will be preserved. The combined signal will then be monitored using the channel path and the fader of the "new" channel in the normal way.

Thus, in FIG. 12A, signals from four microphones 150 for channels C1, C2, C3 and C4 are passed via respective MTSEND faders 152 to respective main-A switches 152. Control of the main-A switches 152 is linked to that for main-B switches 157 as will become apparent later. In FIG. 12A the output from each of the MTSEND faders 151 is passed to respective routing matrices 153. In the routing matrices for channels C1 and C2, the signals from those channels are passed to a first mixer 154 and a first group trim fader 155 to be recorded on a first recording track on the recorder 156. In the routing matrices for channels C3 and C4, the signals from those channels are passed to a second mixer 154 and a second group trim fader 155 to be recorded on a second recording track on the recorder 156. The outputs from the first and second tracks on the recorder 156 are output via first and second channel faders 157 and main-B switches 158 and via a mixer 159 to the main output.

In FIG. 12B, the track bounce feature will be further explained whereby the original recording on first and second tracks and are used to form a new recording on a third track.

By deselecting the main switch for the channels C1 and C2, the main-A switch for those channels is connected to track bounce lines from the output of the channel faders 157 for those channels rather than to the MTSEND faders 151. At the same time the main-B switches 158 for channels 1 and 2 are deselected so that the output from those channels is no longer passed to the mixer 159.

Thus, in FIG. 12B, signals from the channel faders for channels C1 and C2 are passed via respective main-A switches 152 to respective routing matrices 153. In the routing matrices for channels C1 and C2, the signals from the track bounce signals are passed to a third mixer 154 and a third group trim fader 155 to be recorded on a third recording track on the recorder 156. The output from the third track on the recorder 156 is output via a third channel fader 157 and main-B switch 158 and via the mixer 159 to the main output 159.

Figure 13:
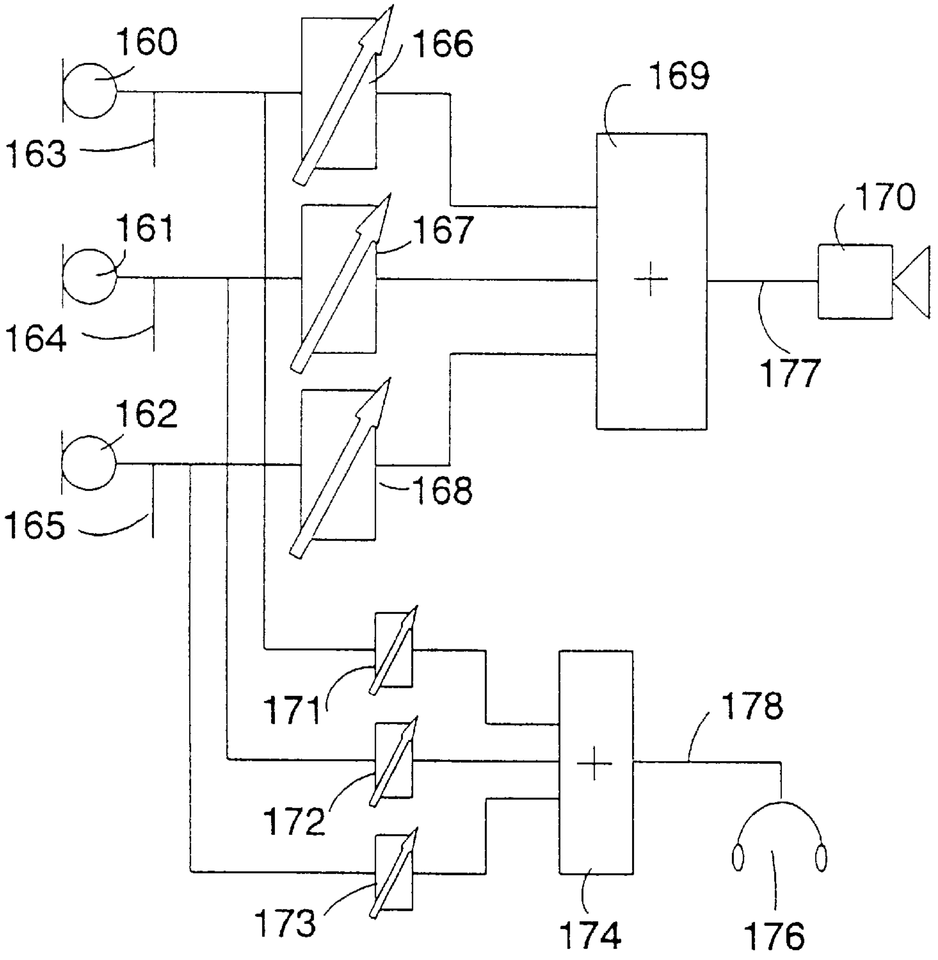
FIG. 13 is a schematic representation of a function for setting cue fader settings.

FIG. 13 represents a mechanism whereby selected outputs may be provided to a "cue bus", for example to provide a fold-back output for performing artists in addition to the main channel output. FIG. 13 is intended, schematically, to represent a situation where three recording artists are operating at microphones 160, 161 and 162. It is assumed that processing is performed in the main processing channels, although this is not shown in FIG. 13. The outputs from the microphones 160, 161 and 162 are provided to the main channel faders 166, 167, 168, respectively, before being mixed at 169 to be output at 177 to the control room loudspeakers. However, in addition, the outputs from the microphones 160, 161 and 162 are provided to cue faders 171, 173 and 173, respectively, where they are mixed at 174 on to a cue bus 178 to be heard on headphones 176. For implementing each fader, a gain control operator value is stored in a respective gain control storage register for controlling a multiplier or other gain control element. In accordance with an aspect of the invention, a control function is implemented on the control processors whereby gain control operator values stores for the main channel faders 160, 161 and 162 can be copied to the gain control storage registers for the cue faders 171, 172 and 173. A control key is provided on the panel 12 of the console 10 to cause the copying of the gain control values in this manner.

As mentioned above, the present invention relates to a digital audio mixing console. However, the mixing console is used to amplify and control audio signals from devices such as analogue microphones. Also, additional devices, commonly referred to as "outboard" equipment, have to be integrated with the mixing console. A particular device may be used on a single audio signal within the console. Typically, in audio mixing consoles, insert points are provided whereby the outboard equipment can be connected. This consists of a physical connection from the audio processing channel concerned (usually through a patch bay or connector panel) which allows a specific channel chain on the console to be interrupted, and the external device to be "inserted" into the signal path. This feature is still required in digital mixing consoles, but additional problems occur. If, as is typically the case, the "outboard" device is analogue in nature, it is necessary to provide digital-to-analogue conversion (DAC) for the output to the device and analogue-to-digital conversion (ADC) for the input from the device. These devices typically have an intrinsic delay of perhaps 2–3 mS for the DAC-ADC pair and this results in the signal from the inserted device arriving later than it would have done, relative to a signal with no inserted device. If such signals are subsequently mixed together, these timing errors will result in a deterioration of the sound quality.

Currently available consoles generally provide one or two approaches to this problem. Either it is ignored completely, or a user-controlled delay is provided in each channel to allow the user manually to delay other signals in the console to compensate for an insert in one channel. This solution is extremely cumbersome for the operator and generally also only allows signals to be co-timed at one particular point in the channel (eg the main mix bus). Other buses such as cue buses (for musician's headphones) may not be compensated, particularly if several channels are using inserts at different points along the channel and the cue bus is connected part way along the channels where the relative timing between the channels is different from that at the main mix bus.

Figure 14:
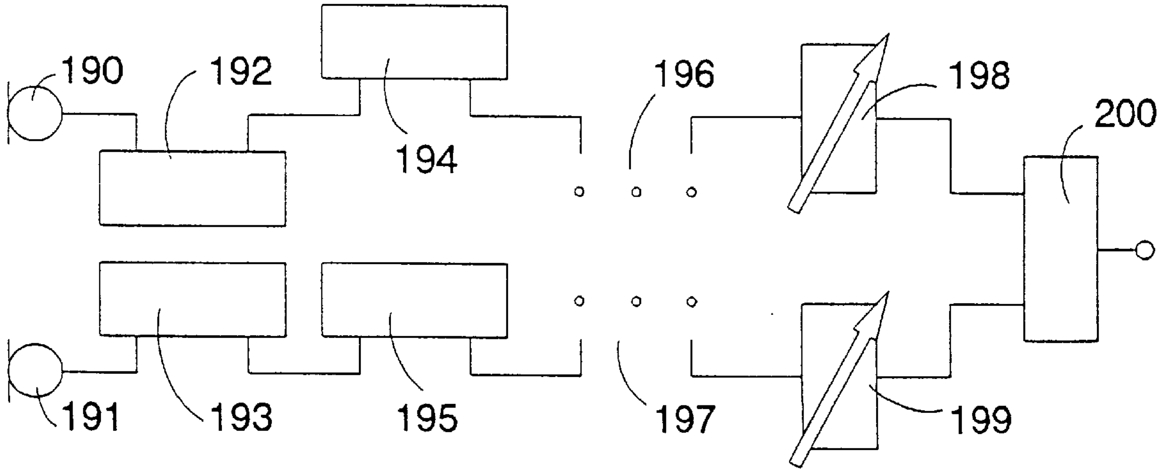
FIG. 14 is a schematic representation of two parallel channels.

FIG. 14 illustrates a situation where two channels, for example from two microphones 190 and 191 are mixed at 200 after being passed via a number of processing stages 192, 194, 196, 198 and 193, 195, 197, 199, respectively. It is assumed that each of the processing stages can include a selectable function from among the functions 92.1–92.7, etc. as illustrated in FIG. 7 or no function at all. As each processing function will include an intrinsic delay, which is different for different processes, account has to be taken of this in order that the processing of each channel is kept in step, it is assumed that all of the stages with the exception of stage 194 are digitally processed, but that stage 194 is an outboard analogue function. Analogue functions require a greater processing time that digital functions due to the time required for D/A and A/D conversion. In order that the stages are kept in step, it is thus necessary to build in an additional compensating delay in step 195.

One approach to this problem would be to build into each stage a delay component to increase the delay for that function to be equal to the worst case delay, typically the delay resulting from an outboard analogue insert functions requiring D/A and A/D conversion. However, this would introduce excessive overall processing delays.

Accordingly, as is illustrated in FIG. 7, selectable delay element 95 are provided which can be selected for a given channel to compensate for the additional delay in corresponding stage of a parallel channel to be a mixed with the given channel. The additional delay can be selected by means of the multiplexers 96. The multiplexers can be switched automatically when an outboard analogue function is selected for a corresponding stage in parallel channel. Alternatively, they can be selected manually. Typically the delay 95 is fixed, but it could alternatively be a variable delay.

Each of the digital audio processing functions could be provided with a built-in delay element to equalise the delays for the digital processing functions. It will be noted from FIG. 7 that the further delay elements 93 provide a delay equivalent to the delay of the digital processing functions for delay compensation on the selection of a straight through path. This mechanism provides a ready and effective mechanism for ensuring that the channels are kept in step at each stage.

As an alternative to each audio processing function including its own delay compensation, the simple delay elements 95 could be replaced by a more complex arrangement of selectable delays, an appropriate delay for a stage being selected depending on the audio processing function for that stage. In this case, a plurality of selectable delays, including a straight through path can be provided.

With either arrangement, at every point in the audio processing chain where an insert can be placed, a delay 95 is provided which can be switched in and out. The delay time can be set to provide delay equalisation equivalent to that for a DAC-ADC pair for the worst case outboard analogue insert. For each possible insert location in the channel a monitoring arrangement is provided to detect whether an analogue insert is switched in or not. These values are then automatically used to establish whether any channel has an insert at a particular point. If so, then channels to be merged which do not have an insert at that point are forced to insert the delay 95 instead. By this mechanism, all possible signal paths in the console are always correctly timed relative to each other with the smallest overall delay compatible with such a timing.

In some applications, for example a "live-to-air" mix, it is undesirable to insert delays during the program section itself, and thus controls are necessary for the operator to override the automatic process. Three modes are provided which are selectable by the user as follows:

1. automatic—the delays are recalibrated immediately that any of the insert switching is changed;
2. manual—the delay selections are frozen in their present stage, manually presetting a button recalibrates the delays for the present arrangement of inserts and this state is then frozen until the button is pressed again; and
3. off—no delay compensation is provided and all delays are switched to the zero delay position.

It will be appreciated that the delay function can be implemented as hardware function using electronic logic elements or as a software function within the control processor structure.

Figure 15:
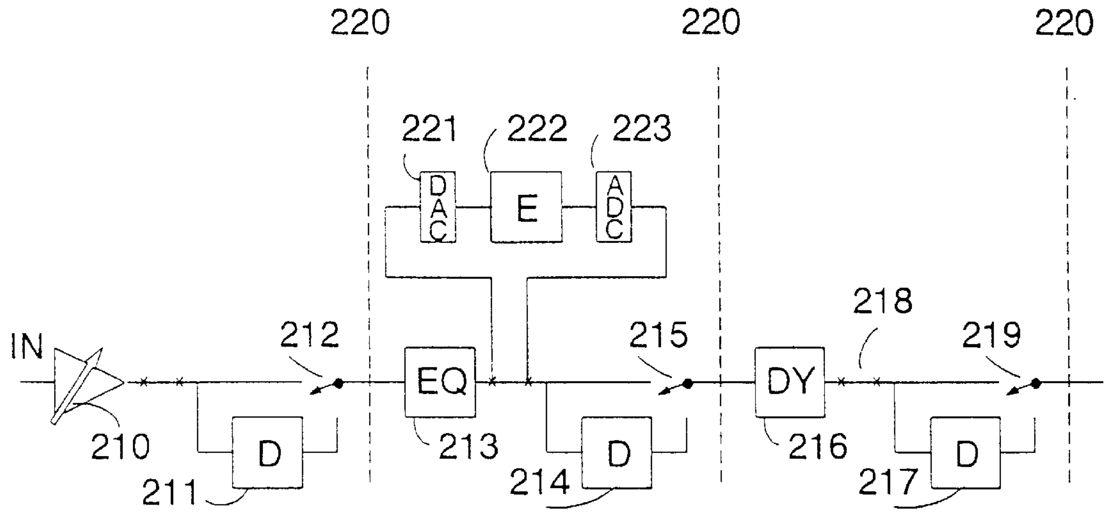
FIG. 15 is a schematic representation of a variable delay function.

FIG. 15 illustrates an alternative representation of the provision of a switchable delay relating to the switching in of an external effect 222 with a digital-to-analogue converter DAC 221 and an analogue-to-digital converter ADC 223 at an insert point represented by the two small crosses. Specifically, an input IN is passed via a fader 210 and an insert point 218 (at which no insert tis made) and then to a signal output from this first stage, either directly or via the delay D 211 as selected by the switch 212. The signal output from the first stage at the main bus 220 is then passed to the equalisation stage 213 following which the effect 222 is inserted. Once again, the signal is output, either directly or via the delay D 214 as selected by the switch 215, to the main bus 220. From the main bus 220 the effect is passed via the dynamics processor 216 and via a further insert point 218 (at which no insert is made), the output then being output directly to the main bus 220 or via the delay 217 determined by the switch 219.

Thus, the arrangement described provides for the compensation of delays caused by the use of analogue insert points in a digital audio mixing console. It provides correct compensation of all signal paths, even in a complex console. Compensation can be automatic, without requiring intervention from the operator, or manual to prevent disturbance of a running program. Compensation can be achieved with the minimum additional delay compatible with correct timing. The arrangement can automatically be calibrated to compensate for the delay of the effect 222 as well as the audio-to-digital converter and digital-to-audio converter delays. This can be achieved using an impulse generator to provide a test input to each channel and then measuring the detected delay along the channel.

Figure 16:
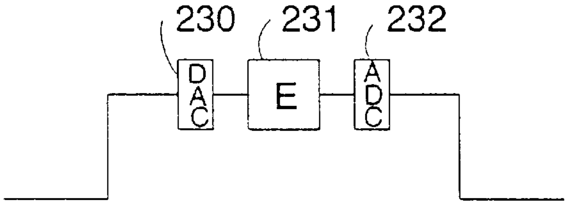
FIG. 16 is a schematic representation of the insertion of an analogue effect.

Sometimes, it will be necessary to insert more than one external analogue effect sequentially (that is immediately after a preceding analogue effect). Thus, to implement each analogue effect in accordance with FIG. 16 (that is a DAC 230 followed by an effect 231 followed by an ADC 232) will mean that a significant delay has been inserted in the audio processing chain. As mentioned above, whenever an analogue peripheral device (eg an effects device) is inserted into the signal chain with a DAC and an ADC, an overall delay of 2–3 mS results which has to be compensated for elsewhere in the signal chain.

Figure 17:
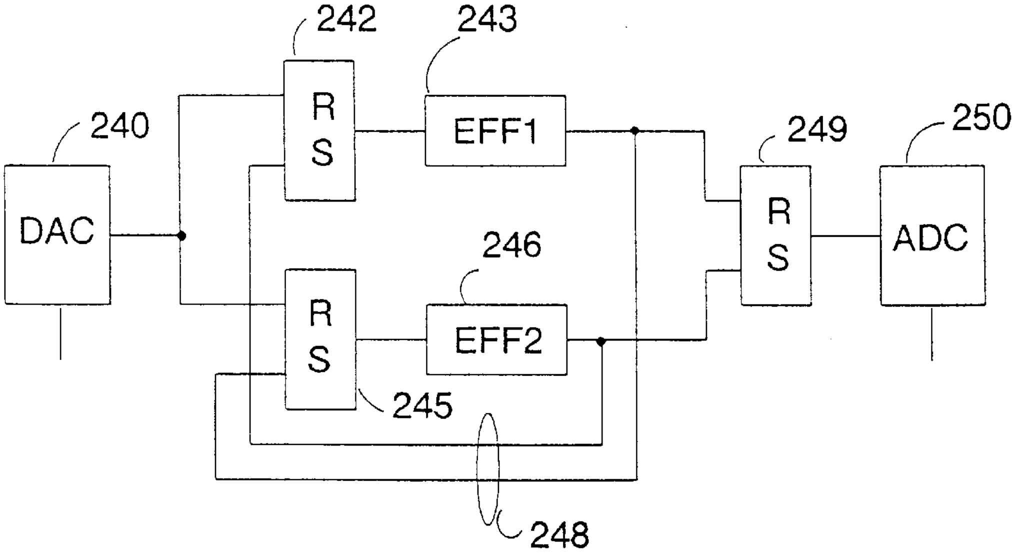
FIG. 17 is a schematic representation of an arrangement for chaining analogue effects.
Figure 18:
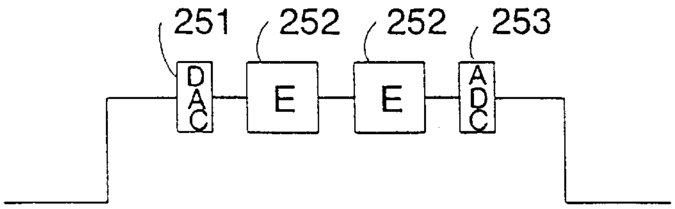
FIG. 18 is a schematic representation of the insertion of chained analogue effects.

In accordance with aspects of an embodiment of the invention represented schematically in FIG. 17, each effect 243, 246, etc. is provided with an input routing switch 242, 245 and an output routing switch 244, 246 and the ADC 250 is provided with a routing switch 244. These routing switches can be freely configured to establish a desired signal path from the DAC 240 to the ADC 250. Thus, by appropriate selection of the connections to the routing switches, an analogue sub-chain of analogue effects can be produced which is then inserted into the digital audio processing chain via a single DAC and ADC as represented in FIG. 18 where a single DAC 251 is connected to a first analogue effect 252 which in turn is connected to a second analogue effect 253 which in turn is connected to a single ADC 254. As a result of the arrangement shown in FIG. 18, the overall signal delay can be reduced.

Thus there has been described an embodiment of an audio mixing console for processing a plurality of audio channels, in each of which a plurality of audio processing functions are to be performed, has a control panel including a plurality of input fields for selecting audio processing functions, displaying an audio processing function selected and indicating a selected order of audio processing functions for the audio processing channel stages. A stereo mode which can be selected at an input field links adjacent channels. Grouped side chain processes can be defined. A recording input matrix provides a track bounce facility for preserving a channel mix on re-recording a mix of previously recorded tracks. Values for cue faders can be loaded automatically from the main channel faders. Selectable delays can be provided at each processing stage to maintain channel alignment. Also, the chaining of analogue audio functions is provided.

Although particular embodiments of the invention have been described in the present application, it will be appreciated that many modifications and/or additions may be made to the particular embodiments within the spirit and scope of the present invention.

We claim:

1. An audio mixing console for processing a plurality of audio channels in each of which a plurality of audio processing functions are to be performed, said audio mixing console comprising a control panel including a plurality of input fields each for selecting an audio processing function for a respective stage in an audio processing channel, means for displaying an audio processing function selected, means for indicating a selected order of audio processing functions for said audio processing channel stages, and stereo mode means selectable for a given channel and responsive to selection of a left channel stereo mode function to activate a right channel stereo mode function in the next channel to the right on the panel of the given channel, and responsive to selection of a right channel stereo mode function to activate a left channel stereo mode function in the next channel to the left on the panel of the given channel.

2. An audio mixing console for processing a plurality of audio channels in each of which a plurality of audio processing functions are to be performed, said audio mixing console comprising stereo mode device selectable for a given channel and responsive to selection of a left channel stereo mode function to activate a right channel stereo mode function in the next channel to the right on the panel of the given channel, and responsive to selection of a right channel stereo mode function to activate a left channel stereo mode function in the next channel to the left on the panel of the given channel.

3. A console according to claim 2, comprising means for defining side chain processing channels for said audio processing channel, bus means interconnecting side chains for respective audio processing channels and logical function means effecting matching of side chain processing of groups of audio processing channels.

4. An audio mixing console for processing a plurality of audio channels in each of which a plurality of audio processing functions are to be performed, said audio processing console comprising means defining side chain processing channels for said audio processing channel, bus means interconnecting side chains for respective audio processing channels and logical function means effecting matching of side chain processing of groups of audio processing channels.

* * * * *